United States Patent
Okuda et al.

(10) Patent No.: US 11,940,280 B2
(45) Date of Patent: Mar. 26, 2024

(54) APPARATUS AND METHOD FOR NAVIGATION ROUTE PLANNING

(71) Applicant: Furuno Electric Co., Ltd., Nishinomiya (JP)

(72) Inventors: Masato Okuda, Kyoto (JP); Takatoshi Morita, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 227 days.

(21) Appl. No.: 17/481,317

(22) Filed: Sep. 22, 2021

(65) Prior Publication Data

US 2022/0178706 A1 Jun. 9, 2022

(30) Foreign Application Priority Data

Dec. 9, 2020 (EP) ................................. 20212730
May 28, 2021 (JP) ............................. 2021-090389

(51) Int. Cl.
- *G01C 21/34* (2006.01)
- *G01C 21/36* (2006.01)
- *G06F 3/0488* (2022.01)

(52) U.S. Cl.
CPC ..... *G01C 21/3415* (2013.01); *G01C 21/3605* (2013.01); *G06F 3/0488* (2013.01)

(58) Field of Classification Search
CPC ............ G01C 21/3415; G01C 21/3605; G01C 21/20; G01C 21/203; G06F 3/0488; G06F 3/0481; G06F 3/04842
See application file for complete search history.

(56) References Cited

U.S. PATENT DOCUMENTS

| | | | | |
|---|---|---|---|---|
| 2017/0075556 | A1* | 3/2017 | Kulkarni | G06F 3/04842 |
| 2018/0143023 | A1* | 5/2018 | Bjorke | G06T 19/003 |
| 2019/0120959 | A1* | 4/2019 | Laster | G01S 15/86 |
| 2021/0041258 | A1* | 2/2021 | Simpson | G06Q 30/08 |
| 2022/0316886 | A1* | 10/2022 | Yamabayashi | G01C 21/20 |

FOREIGN PATENT DOCUMENTS

| | | | |
|---|---|---|---|
| JP | 2018-150024 A | 9/2018 | |
| JP | 2018150024 A | * 9/2018 | ................ B43L 9/12 |

OTHER PUBLICATIONS

Nishiyama Naoki, Sep. 27, 2018, English Machine Translation_JP2018150024A provided by Patent Translate by EPO and Google (Year: 2018).*

* cited by examiner

*Primary Examiner* — Peter D Nolan
*Assistant Examiner* — Ashley L Redhead, Jr.
(74) *Attorney, Agent, or Firm* — XSENSUS LLP

(57) ABSTRACT

A navigation planning device configured to receive a navigation start point, a navigation destination point for a navigation route of at least one of a vessel or an aircraft, and a plurality of waypoints between the navigation start point and the navigation destination point, where the plurality of waypoints may be received in at least one of random order or in sequential order. The navigation planning device is configured to determine a positional relationship between the plurality of waypoints, and determine at least one indicator data corresponding to at least one waypoint data of the plurality of waypoints, based on the positional relationship between the plurality of waypoints. The navigation planning device is further configured to output the at least one waypoint data and the corresponding at least one indicator data for the navigation route to a display.

19 Claims, 11 Drawing Sheets

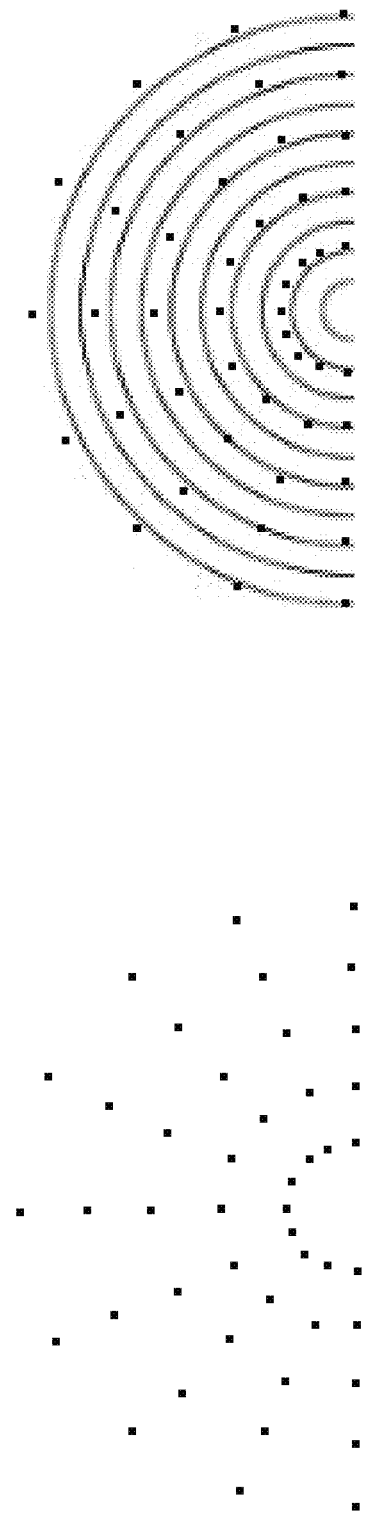
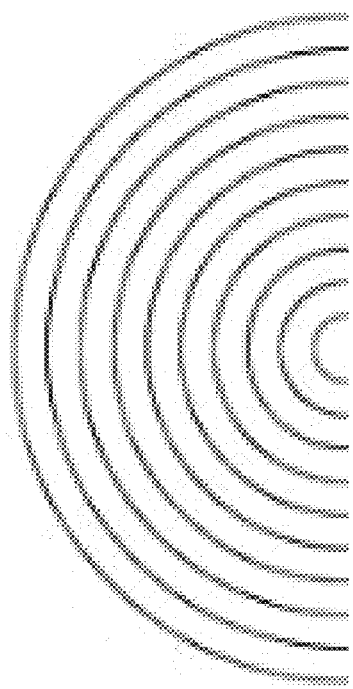
FIG. 3A
FIG. 3B
FIG. 3C

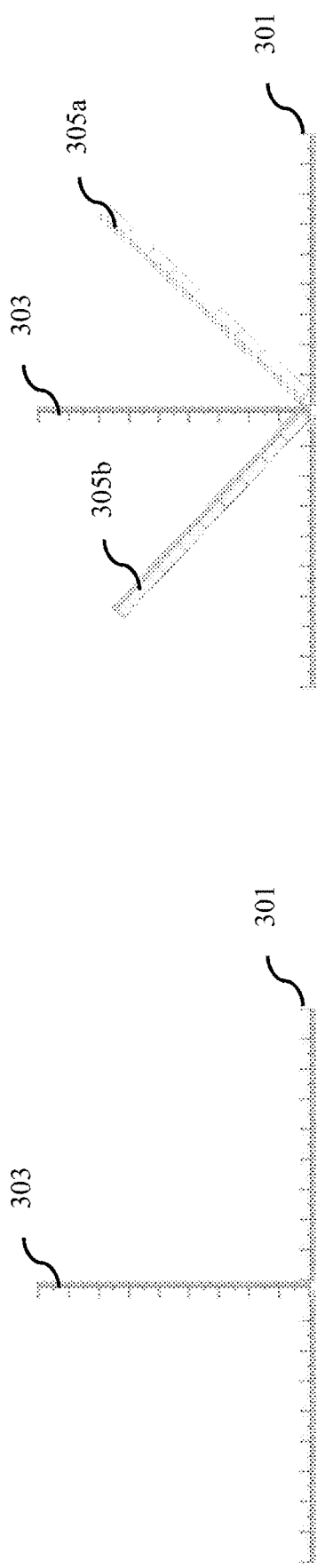
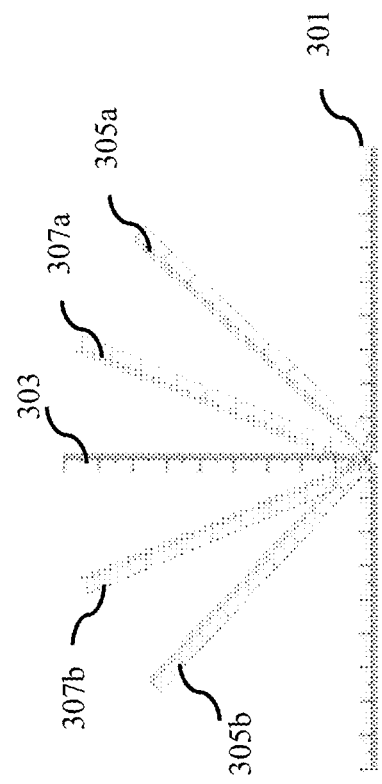

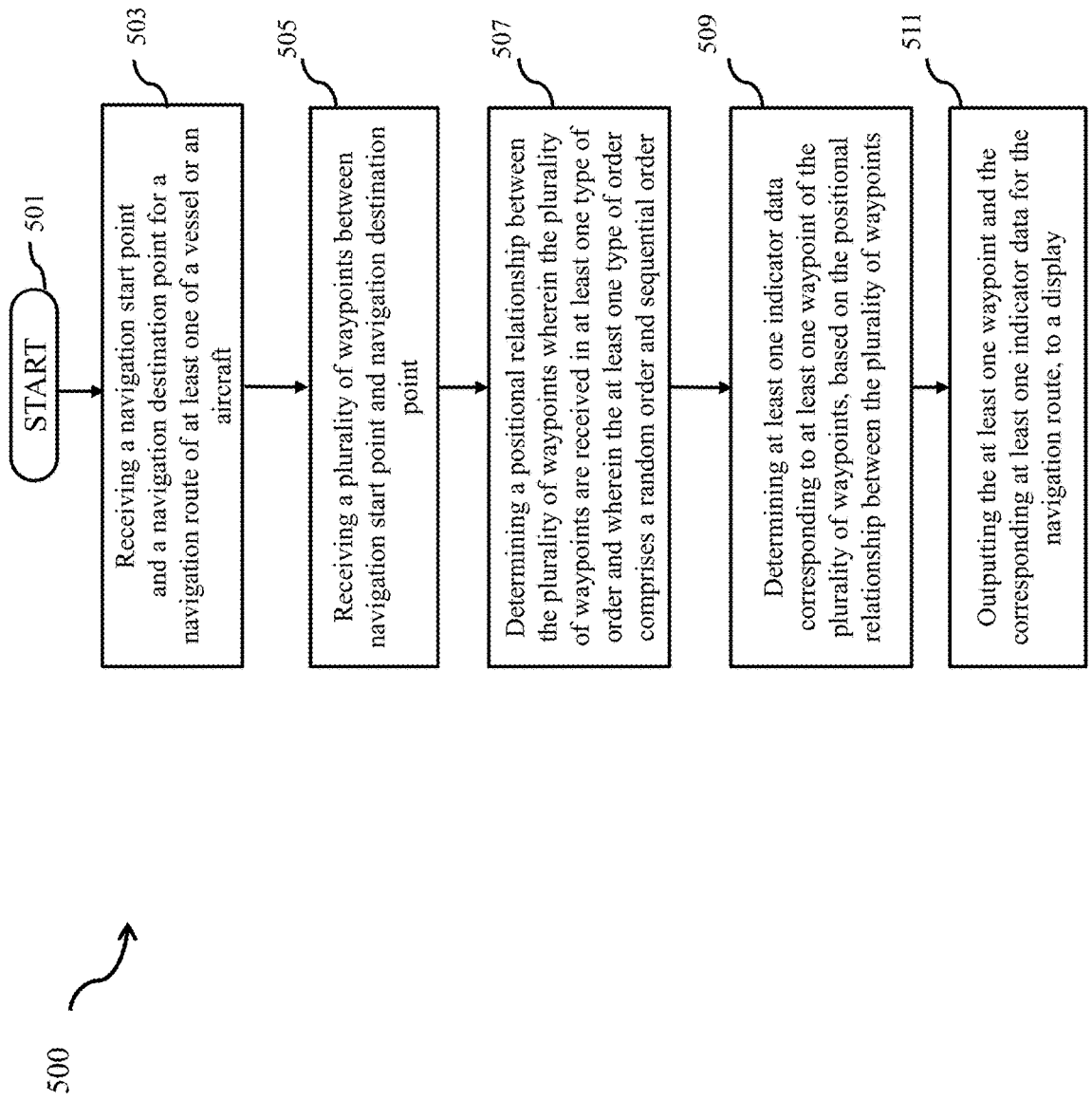

APPARATUS AND METHOD FOR NAVIGATION ROUTE PLANNING

CROSS-REFERENCE TO RELATED APPLICATIONS

The application claims priority under 35 U.S.C. § 119 to European Patent Application No. EP20212730.4, which was filed on Dec. 9, 2020, and the Japanese Patent Application No. JP2021-090389, which was filed on May 28, 2021, the entire disclosure of each are hereby incorporated by reference.

BACKGROUND

Technical Field

An example embodiment of the present application generally relates to a navigation planning device for planning a navigation route.

BACKGROUND OF THE RELATED ART

An Electronic Chart Display and Information Device (ECDIS) displays navigation route information for one or more vessels, where the one or more vessels are navigating through a water body, for example a river, or a sea or the like. The ECDIS displays a chart of a desired sea area on a display by performing software processing of electronic chart data. The ECDIS may comprise a touch sensitive display screen. Therefore, the navigation route can be set on the chart displayed on the touch display screen by touching desired locations on the chart. The navigation route is established by determining a navigation starting point (a starting point) and a navigation destination point (a destination point) of the vessel, and in an interval, determining one or more points called "waypoint" through which the vessel should pass. These waypoints must be accurately located to not cause obstruction to the vessel on the navigation route.

Current navigation route planning devices set the navigation route by sequentially setting waypoints on the screen of the ECDIS apparatus. For example, in JP-PA-2018-150024, the navigation route planning device generates a route line by connecting the sequentially selected previous waypoints to a current waypoint being entered. Further, in order to set the next waypoint from the latest set waypoint, only a guideline value is displayed at the position of a latest waypoint i.e., a current waypoint. Thus, in all such navigation devices discussed above, the waypoints are set one by one in order i.e. sequentially. Additionally, since the conventional navigation apparatus displays only a guideline value for finding the next waypoint, the best navigation route for the vessel cannot be obtained.

However, it is possible to find a better route by temporarily setting a plurality of waypoints and moving the already set waypoints.

Accordingly, there is a need of a navigation planning device that can more accurately and more efficiently set a next waypoint from the already set waypoint in the navigation route of a vessel.

SUMMARY

In order to solve the foregoing problem, the navigation planning device comprises a processing circuitry configured to: receive a navigation start point and a navigation destination point for a navigation route of at least one of a vessel or an aircraft; receive a plurality of waypoints between the navigation start point and the navigation destination point. The processing circuitry is further configured to determine a positional relationship between the plurality of waypoints, where the plurality of waypoints is received in at least one type of order, and where the at least one type of order comprises a random order or a sequential order. The processing circuitry is further configured to determine at least one indicator data corresponding to at least one waypoint data of the plurality of waypoints, based on the positional relationship between the plurality of waypoints; and output the at least one waypoint data and the corresponding at least one indicator data for the navigation route, to a display for displaying the at least one waypoint and the corresponding at least one indicator data.

According to some example embodiment, receiving the navigation start point, the navigation destination point, and the plurality of waypoints corresponds to receiving position data associated with at least one of the navigation start point, the navigation destination point, and the plurality of waypoints, where the position data may be received by at least one of: touching the display, moving a cursor on the display, or by inputting numerical data. Further, the positional relationship may be determined based on the position data of the plurality of waypoints. The processing circuitry may be further configured to determine the navigation route by connecting the navigation start point, one or more waypoints of the plurality of waypoints, and the navigation destination point.

According to some example embodiment, the plurality of waypoints comprise one or more of a first waypoint, a second waypoint, and a third waypoint, where the first waypoint is followed by the second waypoint on the navigation route between the navigation start point and the navigation destination point; where the second waypoint is followed by the third waypoint on the navigation route between the navigation start point and the navigation destination point; where the first waypoint is one or more of previously selected waypoints, the second waypoint is a potential position for a current waypoint, and the third waypoint is a potential position for one or more of next waypoints. Further, the positional relationship between the plurality of waypoints is determined based on position information associated with the one or more of previously selected waypoints and position information associated with the potential position for the current waypoint.

Some embodiments are based on the realization that in order to specify a position of the next waypoint, it is very important to obtain a potential position of a next waypoint and relationship between the next waypoint and current waypoint or already set waypoints.

According to some example embodiment, the at least one indicator data comprises: a first indicator data corresponding to the current waypoint, where the first indicator data indicates a distance from the current waypoint, where the distance is displayed in a current waypoint area opposite the potential position of the one or more of previously selected waypoints. Further, a second indicator data corresponding to the next waypoint, where the second indicator data indicates a distance from the next waypoint, where the distance is displayed in a next waypoint area opposite the potential position of the current waypoint; and where the first indicator data and the second indicator data are displayed simultaneously.

According to some example embodiment, where a first orientation associated with the display of the first indicator data may be determined based on the positional relationship between the first waypoint and the second waypoint. Further, a second orientation associated with the display of the second indicator data may be determined based on the positional relationship between the second waypoint and the third waypoint; and when the potential position of the second waypoint is moved, the first orientation and the second orientation are changed, simultaneously, based on the movement of the potential position of the second waypoint.

According to some example embodiment, a first orientation associated with the display of the first indicator data and a second orientation associated with the display of the second indicator data may be determined by setting the first orientation and the second orientation to a predetermined point, respectively; and when the potential position of the second waypoint is moved, the first orientation and the second orientation may be changed, simultaneously, based on the movement of the potential position of the second waypoint.

In accordance with various embodiments, the present application proposes a navigation planning device for determining an optimized navigation route for a vessel in a water body or for an aircraft navigating through an aviation path or aerial route.

To that end, the navigation planning device obtains navigation start point, navigation destination point, and a plurality of waypoints between the navigation start point and the navigation destination point, where the plurality of waypoints is obtained in at least one of random order or in sequential order. The plurality of waypoints corresponds to potential positions which may be changed in real-time based on the requirement. The navigation planning device determines a positional relationship between the plurality of waypoints.

Further, the navigation planning device allows changing or adjusting the potential positions of the plurality of waypoints, to determine an optimized navigation route, where the optimized navigation route is determined by connecting the navigation start point and the navigation destination point through one or more waypoints of the plurality of waypoints. Based on the positional relationship between the plurality of waypoints, the one or more waypoints of the plurality of waypoints may be adjusted or deleted in order to optimize a navigation route.

The navigation start point, the navigation destination point and the one or more of the plurality of waypoints may each correspond to passing points, that is to say any arbitrary points on the navigation route, and may not necessarily correspond to route origination and route destination points.

The foregoing summary is illustrative only and is not intended to be in any way limiting. In addition to the illustrative aspects, embodiments, and features described above, further aspects, embodiments, and features will become apparent by reference to the drawings and the following detailed description.

In various embodiments, an apparatus, a device, and a method for planning a navigation route for a vessel or an aircraft may be provided. The navigation planning device provides optimized route from a source to a destination for a vessel or an aircraft.

BRIEF DESCRIPTION OF THE DRAWINGS

The navigation planning device is illustrated by way of example and not by way of limitation in the figures of the accompanying drawings, in which the like reference numerals indicate like elements.

FIG. 3A illustrates an indicator display format with a plurality of dots arranged on one or more lines placed at predetermined intervals in predetermined directions, in accordance with an example embodiment.

FIG. 3B illustrates an indicator display format comprising plurality of dots arranged concentrically at predetermined intervals in one or more directions around a waypoint, in accordance with an example embodiment.

FIG. 3C illustrates an indicator display format comprising only concentric half circles at predetermined intervals in a predetermined direction around a waypoint, in accordance with an example embodiment.

FIG. 3D illustrates an indicator display format comprising a center line and an auxiliary line perpendicular to the center line, in accordance with an example embodiment.

FIG. 3E illustrates an indicator display format comprising auxiliary lines in the direction of 45° between the center line and the auxiliary line perpendicular to the center line, in accordance with an example embodiment.

FIG. 3F illustrates an indicator display format comprising another auxiliary line between the auxiliary lines in the 45° direction and the auxiliary lines perpendicular to the center line, in accordance with an example embodiment.

FIG. 5 is a flowchart that illustrates steps of a method executed by the navigation planning device, in accordance with an example embodiment.

DETAILED DESCRIPTION

Figure 1A:
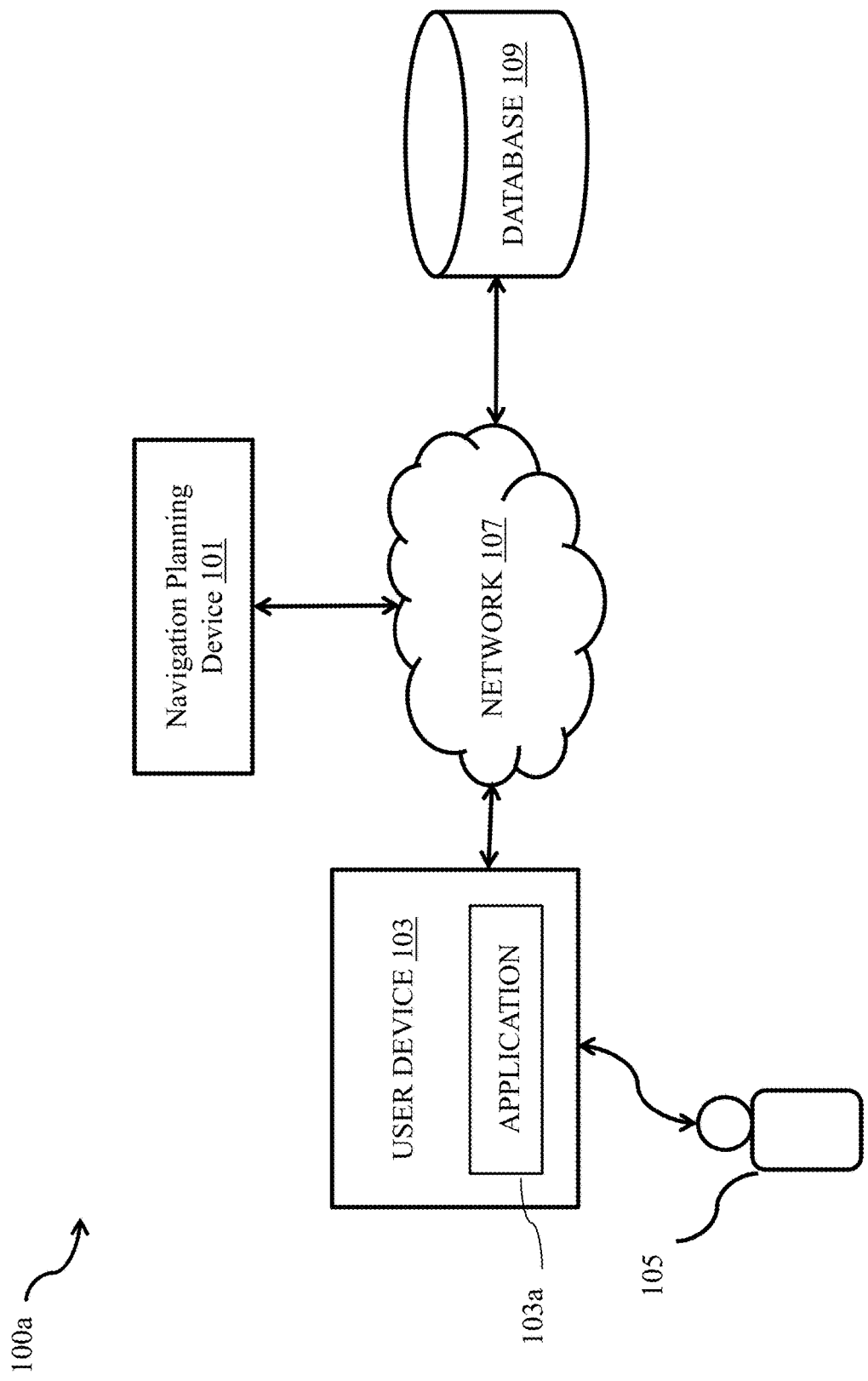
FIG. 1A is a schematic diagram that exemplarily illustrates working environment of a navigation planning device, in accordance with an example embodiment.

In the following description, for purposes of explanation, numerous specific details are set forth in order to provide a thorough understanding of the present application. It will be apparent, however, to one skilled in the art that the present application may be practiced without these specific details. In other instances, devices and methods are shown in block diagram form only in order to avoid obscuring the present application.

Some embodiments of the present application will now be described more fully hereinafter with reference to the accompanying drawings, in which some, but not all, embodiments of the application are shown. Indeed, various embodiments of the application may be embodied in many different forms and should not be construed as limited to the embodiments set forth herein; rather, these embodiments are provided so that this application will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present application. Further, the terms "processor", "controller" and "processing circuitry" and similar terms may be used interchangeably to refer to the processor capable of processing information in accordance with embodiments of the present application. Further, the terms "electronic equipment", "electronic devices" and "devices" are used interchangeably to refer to electronic equipment monitored by the device in accordance with embodiments of the present application. Thus, use of any such terms should not be taken to limit the spirit and scope of embodiments of the present application.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present application. Further, it is to be understood that the phraseology and terminology employed herein are for the purpose of the description and should not be regarded as limiting. Any heading utilized within this description is for convenience only and has no legal or limiting effect.

As used in this specification and claims, the terms "for example" "for instance" and "such as", and the verbs "comprising," "having," "including" and their other verb forms, when used in conjunction with a listing of one or more components or other items, are each to be construed as open ended, meaning that that the listing is not to be considered as excluding other, additional components or items. Other terms are to be construed using their broadest reasonable meaning unless they are used in a context that requires a different interpretation.

One of the objectives of the present application is to determine new one or more waypoints more efficiently and more easily. The new one or more waypoints may be determined based on positional relationship with the previously set waypoints or old waypoints. Further, it is an objective of the present application to determine an optimized navigation route for a navigation means of travel, such as a vessel or an aircraft, based on a set of waypoints where the set of the waypoints comprises old waypoints, current waypoints, and the new waypoints. To that end, a navigation planning device is proposed that receives a plurality of waypoints i.e. tentative locations of the plurality of waypoints in at least one of: random order or in sequential order, where one or more waypoints of the plurality of waypoints are adjusted in order to optimize a navigation route. The navigation planning device is communicatively coupled with an electronic chart display and information device (ECDIS), which displays a map required to plan the navigation route, and where the ECDIS may comprise a touch screen display. A user inputs the plurality of waypoints in at least one of random order or in sequential order along with a navigation start point and a navigation destination point of the navigation route by touching desired locations, moving a cursor on the display panel, or by inputting numerical data on the map displayed on the touch screen display. The plurality of waypoints may not necessarily be route origination and route destination points but may be any passing point any arbitrary point may be used for setting up the navigation route.

Further, receiving the navigation start point, the navigation destination point, and the plurality of waypoints corresponds to receiving position data associated with at least one of the navigation start point, the navigation destination point, and the plurality of waypoints. The position data may be received by at least one of: touching the display panel, a cursor on the display panel, or by inputting numerical data. Further, the navigation planning device determines the navigation route for a vessel to navigate in a water body (for example, ocean). In an example embodiment, the navigation planning device determines the navigation route for an aircraft.

Further, the navigation planning device displays the inputted plurality of waypoints along with the navigation source point and the navigation destination point on the display screen. A position of each waypoint of the plurality of waypoints is selected tentatively. The tentative position of each waypoint of the plurality of waypoints can be moved or adjusted in order to optimize the navigation route by simple drag and drop or by moving back and forth any of the waypoints on the display screen. Thus, the proposed navigation planning device allows the user to temporarily set several waypoints between the navigation start point and the navigation destination point, or for that matter between any two passing points, and then modify the set positions of waypoints to an optimum navigation route while overviewing the entire navigation route.

In an example embodiment, the user inputs at least one passing point which corresponds to an arbitrary location or position on a navigation route. The arbitrary location or position may be either in the water body or on land. For example, a passing point may be set as the navigation starting point, and the position of the plurality of waypoints may be determined between the passing point and the navigation destination point. Conversely, the plurality of waypoints can be determined between the passing point and the navigation destination point. Further, the plurality of waypoints can also be determined between two passing points set on the water body, such as the ocean.

Further, to accurately determine the location of one or more new waypoints the navigation planning device determines a positional relationship between the one or more new waypoints and the previously set waypoints and displays the positional relationship. The positional relationship is used to display indicator data at a currently selected waypoint and at a potential position selected for the next waypoint (or the new waypoint). The indicator data is used to connect one or more waypoints of the plurality of waypoints to determine the optimized navigation route. The navigation planning device uses different types of indicators to ensure accuracy during determination of the new waypoint. In this way, the navigation planning device allows easy and accurate determination of the waypoints and consequently enables determining an optimized navigation route.

FIG. 1A is a schematic diagram that exemplarily illustrates working environment 100a of a navigation planning device 101, in accordance with an example embodiment. In an example embodiment, the navigation planning device 101 is installed at a vessel navigating in a water body. In an example embodiment, the navigation planning device 101 may be installed on an aircraft. The navigation planning device 101 installed on the vessel may be used to determine an optimized navigation route in the water body. The optimized navigation route ensures minimum travelling delay for a vessel on the navigation route in the water body. The water body may comprise a sea, an ocean, a river, or the like. The navigation planning device 101 may obtain inputs from a user 105, where the inputs may comprise location of a navigation start point, location of a navigation destination point, and potential positions of a plurality of waypoints in between the navigation start point and the navigation destination point, where the potential positions may be obtained in random order or in a sequential order starting from the navigation start point, and where the location may comprise position data such as longitude or latitude, direction data, or GPS coordinates, distance from start point, or the like. The navigation planning device 101 is communicatively coupled with a user device 103, and a database 109, via a network 107.

The user device 103 comprises an application 103a installed in it, where the application 103a displays different information associated with navigation for the user 105 operating the user device 103. The user device 103 may be any user accessible device such as a smartphone, a portable computer, a display unit, or the like. In an example embodiment, the user device 103 may include Electronic Chart Display and Information Device (ECDIS). The user device 103 uses the application 103a to display different navigation information such as sea maps, tidal currents of the sea, or the like on a display screen of the user device 103. In an example embodiment, the user device 103 may be configured with a touch screen display.

Further, the database 109 may store updated navigation maps, latest information about the weather forecast, information about the tidal currents, nautical charts that may be used by the vessel for navigating in the water body and determining an optimized navigation route. The database 109 may further comprise dangerous locations in the water body such as location of a whirlpool or the like. The database 109 may comprise navigation data such as information on salinity, water temperature and air temperature, atmospheric pressure, and wind (speed, gusts, and direction), geographical location in terms of longitude and latitude of the vessel, or the like. The database 109 may also comprise updated navigation maps, latest information about the weather forecast, or the like that may be used by an aircraft.

In alternate embodiments, the database 109 may be embodied as a map database and may represent a compiled navigation database that may be used in or with the user device 103 to provide navigation and/or map-related functions to the user 105. In such a case, the database 109 may be downloaded or stored on the user device 103.

The network 107 may comprise suitable logic, circuitry, and interfaces that may be configured to provide a plurality of network ports and a plurality of communication channels for transmission and reception of data, such as selected positions of navigation start point, navigation destination point, plurality of waypoints or the likes. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 107 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 107 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

Some embodiments are based on the recognition that in order to determine the optimized navigation route, the plurality of waypoints must be accurately located so as not to cause obstruction to the navigation route.

To that end, the navigation planning device 101 enables the user 105 to select the plurality of waypoints, where the plurality of waypoints is selected in a random order. The plurality of waypoints corresponds to potential positions, which can be adjusted or deleted based on the requirement in real time to determine an optimized navigation route. Thus, the navigation planning device 101 enables the user 105 to adjust the location of each waypoint of the plurality of waypoints dynamically in order to determine the optimized navigation route. The location of each waypoint is adjusted by the user 105 on a user interface of the user device 103 of the navigation planning device 101. Alternatively, the locations may be adjusted by the user 105 remotely by using the user device 103 which is connected to the navigation planning device 101 via the network 107. For example, in the user device 103 that is configured with the touch screen display displaying the map, the position of each waypoint of the plurality of waypoints can be adjusted by dragging and dropping position of each waypoint of the plurality of waypoint on the map by using the touch screen display. A detailed analysis of the proposed navigation planning device 101 is described below with respect to FIG. 1B.

Figure 1B:
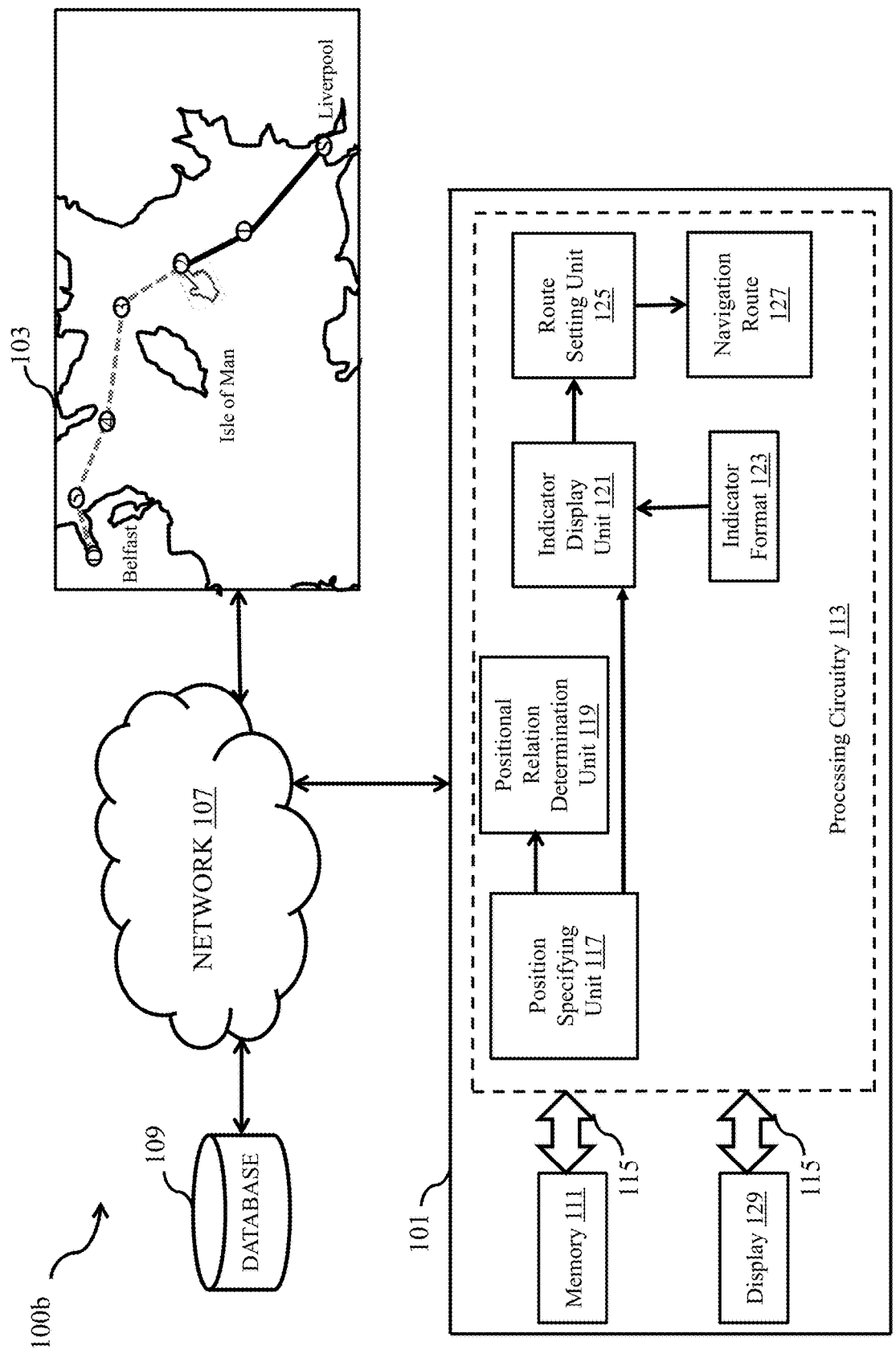
FIG. 1B illustrates a block diagram of the navigation planning device, exemplarily illustrated in FIG. 1A, in accordance with an example embodiment.

FIG. 1B illustrates a block diagram 100b of the navigation planning device 101, exemplarily illustrated in FIG. 1A, in accordance with an example embodiment. The navigation planning device 101 includes a processing circuitry 113 configured to execute stored instructions, as well as a memory 111 that stores instructions that are executable by the processing circuitry 113. The memory 111 is further configured to store a chart data for navigation, where the chart data may comprise map of the water body and other navigational information. The memory 111 can include random access memory (RAM), read only memory (ROM), flash memory, or any other suitable memory devices. The processing circuitry 113 is connected through the bus 115 to the memory 111.

Further, the navigation planning device 101 comprises a display 129, where the display 129 is configured to display at least a part of the chart data. The display 129 is further configured to receive a navigation start point and a navigation destination point for a navigation route of the vessel or the aircraft. The display 129 is further configured to receive a plurality of waypoints between the navigation start point and the navigation destination point. The display 129 may be a touch screen display panel. Further, the display 129 is configured to provide data obtained from the user 105 such as the navigation start point, the navigation destination point, the plurality of waypoints, or the like to the processing circuitry 113 via the bus 115.

The processing circuitry 113 includes a position specifying unit 117, a positional relation determination unit 119, an indicator display unit 121, an indicator format unit 123, and a route setting unit 125 that outputs a navigation route 127. Further, different components of the processing circuitry 113 are connected to the user device 103, where the application 103a may be run at the user device 103 to display the sea map on the display screen of the user device 103. Further, the screen of the user device 103 may be touch screen enabled to obtain inputs from the user 103.

The processing circuitry 113 is configured to use the position specifying unit 117, where the position specifying unit 117 is configured to receive the navigation start point and the navigation destination point for the navigation route of the vessel or the aircraft. Further, the position specifying unit 117 is configured to receive a plurality of waypoints between the navigation start point and the navigation destination point, where the plurality of waypoints is obtained in either random order or in sequential order starting from the navigation start point. The locations of the navigation start point, the plurality of waypoints, and the navigation destination point may be specified, by the user 105, on the map displayed on the touch screen display panel of the display 129 by directly touching at the specific locations or moving a cursor on the display panel, or by inputting numerical data on the map. In another embodiment, the user 105 may use the user device 103 to remotely specify locations of the navigation start point, the plurality of waypoints, and the navigation destination point on the map displayed on the touch screen of the user device 103. The plurality of waypoints comprises one or more previously selected waypoints, a current waypoint, a passing point and one or more next way points. Further, in order to determine the optimized navigation route, a positional relationship between the plurality of waypoints is required.

To that end, the processing circuitry 113 is configured to use the positional relation determination unit 119, where the positional relation determination unit 119 is configured to determine the positional relationship between the plurality of waypoints. The positional relationship is determined based on position data of the plurality of waypoints, where the position data may comprise longitude and latitude information associated with each waypoint of the plurality of waypoints.

The processing circuitry 113 is further configured to use the indicator display unit 121, where the indicator display unit 121 is configured to determine at least one indicator data corresponding to at least one waypoint of the plurality of waypoints, based on the positional relationship of the plurality of waypoints. The indicator display unit 121 further outputs the at least one waypoint and the corresponding at least one indicator data to the display 129 for display on the display panel. The at least one indicator data comprises a first indicator data (or a current indicator data) corresponding to the current waypoint, where the first indicator data indicates a distance from the current waypoint. The distance from the current waypoint is displayed in a current waypoint area opposite the potential position of the one or more previously selected waypoints. Further, the at least one indicator data comprises a second indicator data (or a next indicator data) corresponding to the next waypoint, where the second indicator data indicates a distance from the next waypoint. The distance from the next waypoint is displayed in a next waypoint area opposite the potential position of the current waypoint. In an example embodiment, the first indicator data and the second indicator data may be displayed simultaneously. Further, the indicator display unit 121 obtains different indicator data display formats (illustrated in FIGS. 3A-3F) from an indicator format unit 123 and allows the user 105 to select any one of the different indicator data display formats. In another embodiment, the indicator display unit 121 may also provide its output to the user device 103 via the network 107, where the output of the indicator display unit 121 may be displayed on the user device 103.

Further, the indicator display unit 121 is communicatively coupled with the route setting unit 125, where the route setting unit 125 is configured to determine the navigation route by connecting the navigation start point, one or more waypoints of the plurality of waypoints, and the navigation destination point. The route setting unit 125 uses the indicator data generated by the indicator display unit 121 to determine which one or more waypoints of the plurality of waypoints should be connected in order to determine the optimized navigation route 127. The optimized navigation route 127 is displayed on the display 129. In another embodiment, the optimized navigation route may be displayed on the user device 103. In this case, the route setting unit 125 communicates directly with the user device 103 such as ECDIS through the network 107 to determine the optimized navigation route 127.

In an example embodiment, the indicator data is used to indicate the positional relationship between the current waypoint and at least one waypoint of the one or more next waypoints of the plurality of waypoints.

In another example embodiment, the indicator data is used to indicate changes in the positional relationship between the plurality of waypoints, when any of the previously selected corresponding waypoints is adjusted. Thus, indicator data ensures efficient and accurate selection of the one or more next waypoints based on the current waypoint and the one or more previously set waypoints.

Further, the processing circuitry 113 is configured to output data for displaying the indicator data in one or more formats. To that end, the processing circuitry 113 uses the indicator format unit 123. The one or more formats for the indicator data may comprise plurality of dots arranged Off on one or more lines placed at predetermined intervals in predetermined directions, where the predetermined intervals and directions may be an angle that indicates degree of separation between the plurality of dots. In another indicator data display plurality of dots are arranged concentrically at predetermined intervals in one or more directions around a waypoint. Other different formats of the indicator data are described with respect to FIGS. 3A-3F.

In another embodiment, the navigation planning device 101 may be a navigation planning apparatus. The navigation planning apparatus 101 comprises a memory 111 configured to store a chart data for navigation, a display 129 configured to: display at least a part of the chart data on a display panel and further, receive a navigation start point and a navigation destination point for a navigation route of at least one of a vessel or an aircraft. The display 129 is further configured to receive a plurality of waypoints between the navigation start point and the navigation destination point, where the plurality of waypoints is received in at least one type of order, and where the at least one type of order comprises a random order or a sequential order. In some embodiments, the navigation start points, and the navigation end point are passing points only.

The navigation planning apparatus 101 further comprises a processing circuitry 113 configured to: receive the navigation start point, the navigation destination point, and the plurality of waypoints. The processing circuitry 113 is further configured to determine a positional relationship between the plurality of waypoints, based on the position data of the plurality of waypoints, and determine at least one indicator data corresponding to at least one waypoint data of the plurality of waypoints, based on the positional relationship between the plurality of waypoints. Further, the navigation planning apparatus 101 may use the display 129 to display the at least one waypoint data and the corresponding at least one indicator data for the navigation route on the display panel.

Further, a detailed explanation associated with a user interface used by the user 105 to input different position data associated with the navigation route is explained below with respect to FIGS. 2A-2D. The user 105 inputs position data associated with the navigation route through the display 129 of the navigation planning apparatus 101. In another embodiment, the user 105 may input the position data associated with the navigation route through the user device 103. In both the cases, the user interface shown to the user 105 to receive the position data remains same. FIGS. 2A-2D below provides a detailed description of the user interface used to input position data either through the display 129 or the user device 103.

Figure 2A:
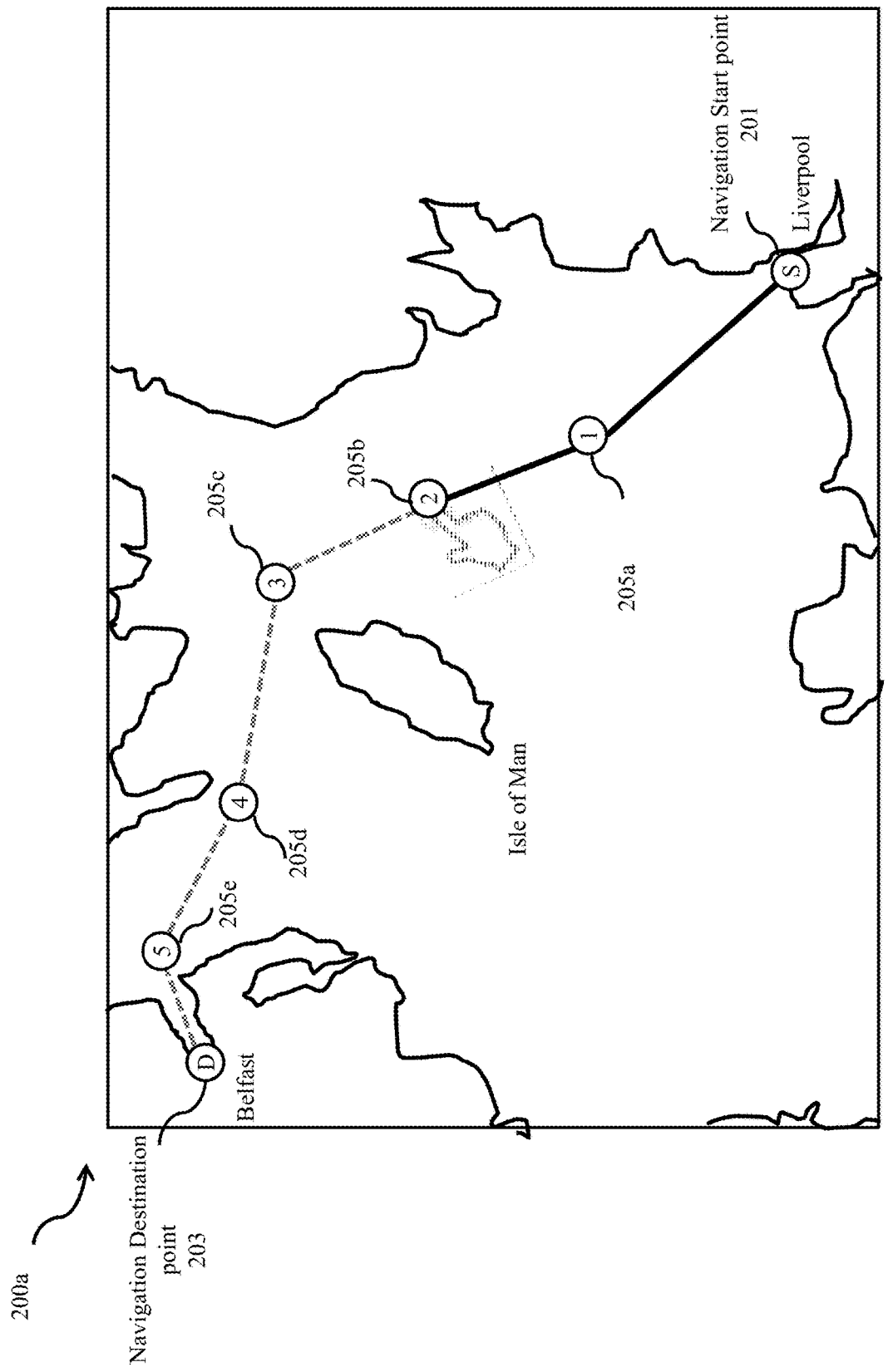
FIG. 2A illustrates a user interface to input the navigation start point, the navigation destination point, and the plurality of waypoints in a sea map, in accordance with an example embodiment.

FIG. 2A illustrates a user interface 200a to input a navigation start point 201, a navigation destination points 203, and a plurality of waypoints 205a-205e in a navigation map, in accordance with an example embodiment. The user 105 may first input the navigation start point 201 and the navigation destination point 203 by touching at specific locations, moving the cursor on the display panel, or by inputting numerical data in the navigation map displayed on the user interface 200a. For example, the user 105 may select Liverpool as the navigation start point 201 and Belfast as the navigation destination point 203. Further, the navigation start point 201 may be represented by letter "S" and the navigation destination point 203 may be represented by letter "D", thus, enabling the user 105 to separate the navigation start point 201 and the navigation destination point 203 from the plurality of waypoints 205a-205e.

Further, the user 105 may select random locations for the plurality of waypoints 205a-205e between the navigation start point 201 and the navigation destination point 203 on the navigation map. In another embodiment, the locations of the plurality of waypoints 205a-205e may be selected in a sequential order starting from the navigation start point 201. The selected locations are potential locations (or tentative locations) of the plurality of waypoints, where the tentative location of any waypoint of the plurality of waypoints 205a-205e may be adjusted by moving or deleting any waypoint in order to determine the optimized navigation route. In the FIG. 2A, five tentative locations of the plurality of waypoints 205a, 205b, 205c, 205d, and 205e are selected, where each waypoint of the plurality of waypoints 205a-205e are selected consecutively and in progression for the navigation route starting from the navigation start point 201 to the navigation destination point 203.

The optimized navigation route is determined by connecting the navigation start point 201 to the navigation destination point 203 via one or more waypoints of the plurality of waypoints 205a-205e. In FIG. 2A, an intermediate navigation route from S to the waypoint 205b is determined. The waypoint 205b is the current waypoint, 205a is a previously selected waypoint, and the waypoints 205c-205e are next waypoints which are not yet considered or connected in the navigation route. The navigation planning device 101 enables the user 105 to adjust any of the current waypoint 205b, previously selected waypoints 205a, and the next waypoints 205c-205e to plan the optimized navigation route for the vessel.

In an example embodiment, an arbitrary position either in the water body or in the land may be selected as a passing point. For example, the passing point may be set as the navigation starting point 201, and the position of the plurality of waypoints 205a-205e can be determined between the passing point and the navigation destination point 203. Similarly, point 205b may be selected as the passing point and the plurality of waypoints 205c-205e can be determined between the passing point 205b and the navigation destination point 203. Further, points 205e and 205a may be selected as two passing points and the plurality of waypoints 205a-205e can also be determined between two passing points 205e and 205a set on the ocean.

Figure 2B:
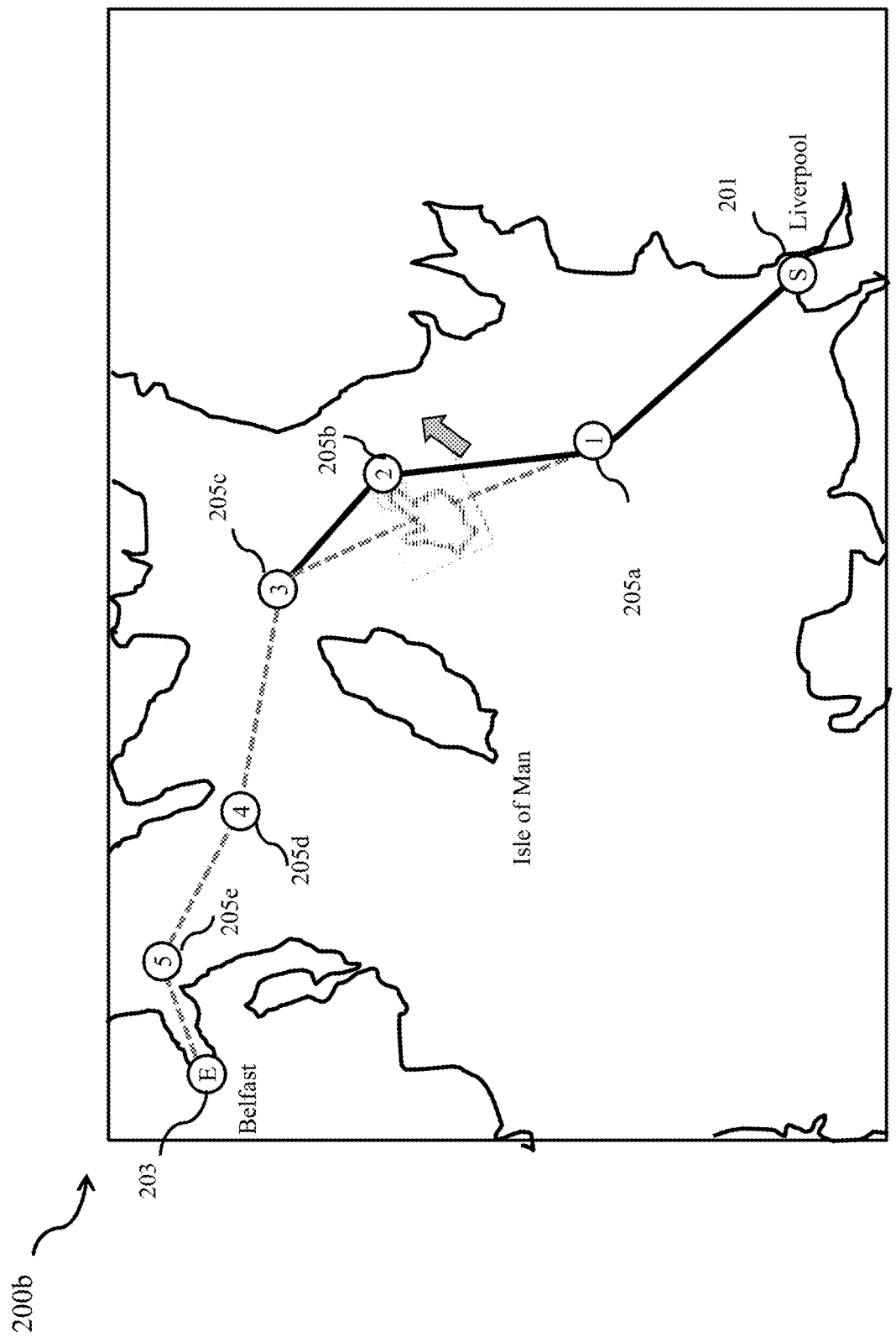
FIG. 2B illustrates a user interface, where the position of a waypoint of the plurality of waypoints is changed, in accordance with an example embodiment.

FIG. 2B illustrates a user interface 200b, where the position of the waypoint 205b of the plurality of waypoints 205a-205e is changed in the navigation map, in accordance with an example embodiment. In FIG. 2B, an intermediate route from the navigation start point 201 to the waypoint 205c is determined. However, it may be realized after planning the intermediate route, the position of the waypoint 205b is required to be changed. The position of the waypoint can be changed easily by touching the waypoint 205b and by adjusting the position of the waypoint 205b as per the requirement. The position of the waypoint 205b is also changed by moving the cursor on the display panel or by inputting numerical value of the waypoint 205b.

Figure 2C:
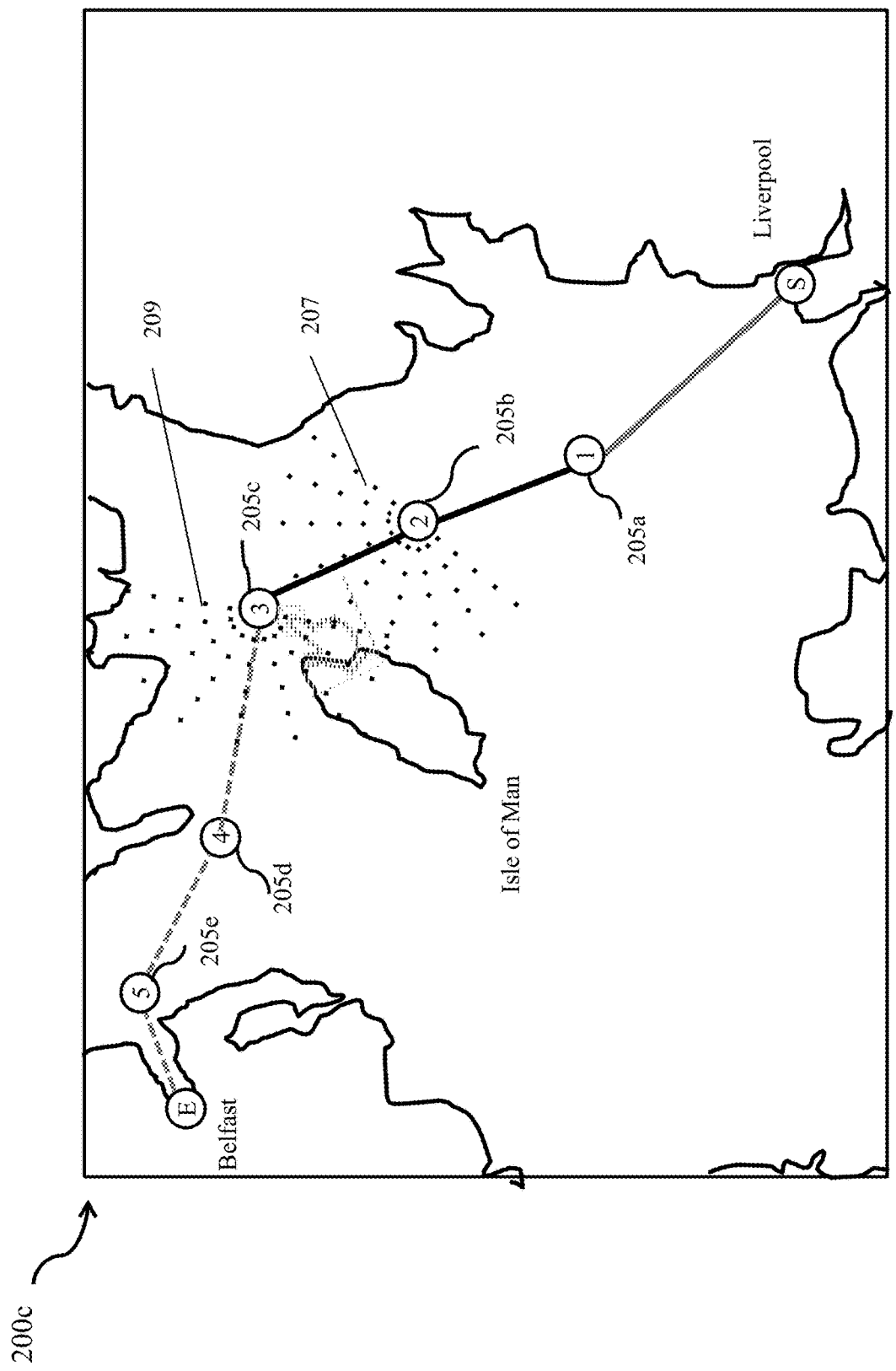
FIG. 2C illustrates a user interface displaying of a first indicator data and a second indicator data, in accordance with an example embodiment.

FIG. 2C illustrates a user interface 200c displaying a first indicator data 207 and a second indicator data 209, in accordance with an example embodiment. In FIG. 2C, the waypoint 205b is the current waypoint and the waypoint 205c is the next waypoint. When the position of the current waypoint 205b and the next waypoint 205c are tentatively set, the first indicator data 207 i.e., a current indicator data and the second indicator data 209 i.e., a next indicator data are displayed for the current waypoint 205b and the next waypoint 205c, respectively.

The current indicator data 207 is a semicircular polar dot display. The orientation of the current indicator data 207 is determined by the positional relationship between the previous waypoint 205a and the current waypoint 205b. Further, the orientation corresponds to the direction of a line connecting the previous waypoint 205a and the current waypoint 205b. Similarly, the next indicator data 209 is also a semicircular polar dot display, where the orientation of the next indicator data 209 is determined by the positional relationship between the current waypoint 205b and the next waypoint 205c. Further, the orientation of the next indicator data 209 coincides with the direction of a line connecting the current waypoint 205b and the next waypoint 205c.

The current indicator data 207 indicates a distance from the current waypoint 205a. Further, the distance is displayed in a current waypoint area opposite the potential position of the one or more of previously selected waypoints. The navigation planning device 101 is further configured to display the next indicator data 209 corresponding to the next waypoint 205c. The next indicator data 209 indicates a distance from the next waypoint 205c, and further the distance is displayed in a next waypoint area opposite the potential position of the current waypoint 205b. Further, the current indicator data 207 and the next indicator data 209 are displayed simultaneously by the navigation planning device 101.

Figure 2D:
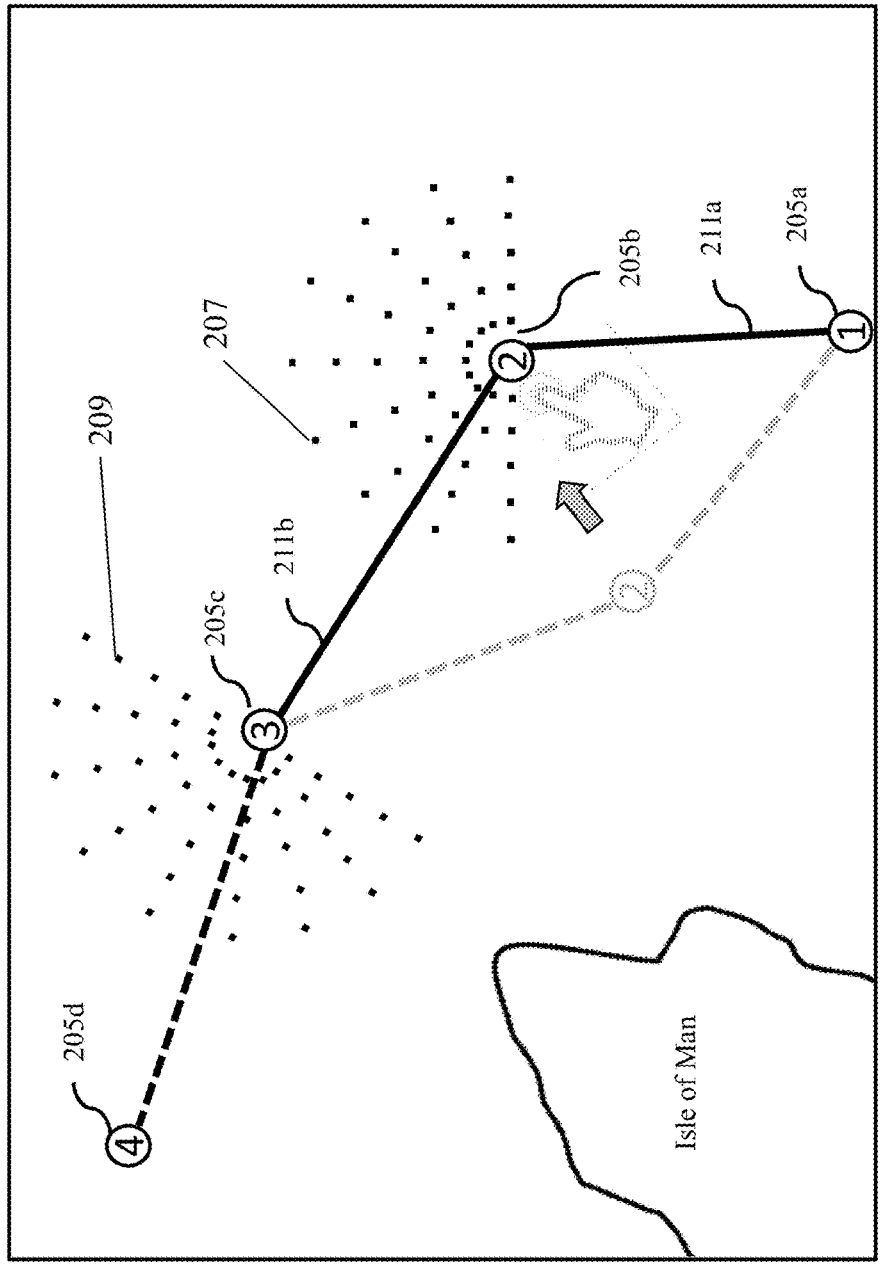
FIG. 2D illustrates a user interface displaying change in the orientation display associated with the first indicator data and in the orientation display associated with the second indicator data when the position of the current waypoint is changed, in accordance with an example embodiment.

FIG. 2D illustrates a user interface 200d displaying change in the orientation display associated with the first (current) indicator data 207 and in the orientation display associated with the second (next) indicator data 209 when the position of the current waypoint 205b is changed, in accordance with an example embodiment. In FIG. 2D, while the position of the next waypoint 205c is tentatively set, the current waypoint 205b can be moved. The orientation of the first indicator data 207 (i.e. the current indicator data) is automatically changed according to the position of the current waypoint 205b. The change in the orientation of the current indicator data 207 is based on the new positional relationship between the current waypoint 205b and the previous waypoint 205a. Further, the orientation display of the next indicator data 209 is changed based on the new positional relationship between the current waypoint 205b and the next waypoint 205c. The dynamic change in the orientation of the current indicator data 207 and the next indicator data 209 enables the user 105 to easily set one or more navigation routes for the vessel in real time and consequently enables the user 105 to decide a better or the optimized navigation route.

As can be observed in the FIG. 2D, an intermediate navigation route is determined by connecting the waypoints 205a, 205b, and 205c, where the position of the waypoint 205b is modified to optimize the intermediate navigation route. The previous waypoint 205a is connected to the current waypoint 205b with a first extension line 211a and similarly, the current waypoint 205c is connected to the tentative next waypoint 205c with a second extension line 211b. The first extension line 211a and the second extension line 211b together forms the intermediate navigation route. A complete navigation route is determined by connecting the navigation start point 201 (for example, Liverpool, not shown in FIG. 2D) to the navigation destination point 203 (for example, Belfast, not shown in FIG. 2D) via the one or more waypoints (for example, 205a-205d) of the plurality of waypoints 205a-205e.

Further, the display of the indicator data may be selected from several types of display formats. Different formats of the indicators are illustrated in FIG. 3A-3G.

FIG. 3A is described in conjunction with FIG. 2D. FIG. 3A illustrates an indicator display format with a plurality of dots arranged on one or more lines placed at predetermined intervals in predetermined directions, in accordance with an example embodiment. The predetermined intervals and directions maybe an angle indicating degree of separation between the plurality of dots. The degree of separation may be pre-determined or dynamically configured in real-time. The one or more lines pass through the corresponding waypoints. Further, one or more directions of the one or more lines are based on the orientation of the indicator data. In an example embodiment, the indicator display format illustrated in FIG. 3A may be used by the current indicator data 207 to determine a distance from the current waypoint 205b to one or more next waypoints 205c-205e and the direction which comprises the potential position of the one or more next waypoints 205c-205e. Similarly, the indicator display format illustrated in FIG. 3A may be used to represent the next indicator data 209, where the next indicator data 209 may be used to determine a distance from a first point (for example, waypoint 205c) of the one or more next waypoints to a second point (for example, waypoint 205d or 205e) of the one or more next waypoints (205c-205e). Therefore, as illustrated in FIG. 2D, the first indicator data 207 includes the plurality of dots arranged on the first extension line 211a, where the first extension line 211a connects the previously selected one or more waypoints (for example, 205a) to the current waypoint (for example, 205b). Similarly, the second indicator data 209 includes the plurality of dots arranged on the second extension line 211b, where the second extension line 211b connects the current waypoint (for example, 205b) to the one or more next waypoints (for example, 205c).

Further, the first indicator data 207 includes the plurality of dots arranged on a first line perpendicular to the first extension line 211a, and where the first line passes through the current waypoint (for example, 205b) Similarly, the second indicator data 209 may include the plurality of dots arranged on a second line perpendicular to the second extension line 211b, and where the second line passes through the next waypoint (for example, 205c). FIG. 3B illustrates an indicator display format comprising plurality of dots arranged concentrically at predetermined intervals in one or more directions around a waypoint, in accordance with an example embodiment. The display format of FIG. 3B is similar to the display format of FIG. 3A except that the plurality of dots are arranged on the concentric half circles around either the current waypoint or the next waypoint. The display format of FIG. 3B may be used to determine more accurate distances from a waypoint as compared to the display format of FIG. 3A.

FIG. 3C illustrates an indicator display format comprising concentric half circles at predetermined intervals in a predetermined direction around a waypoint, in accordance with an example embodiment.

Figure 3G:
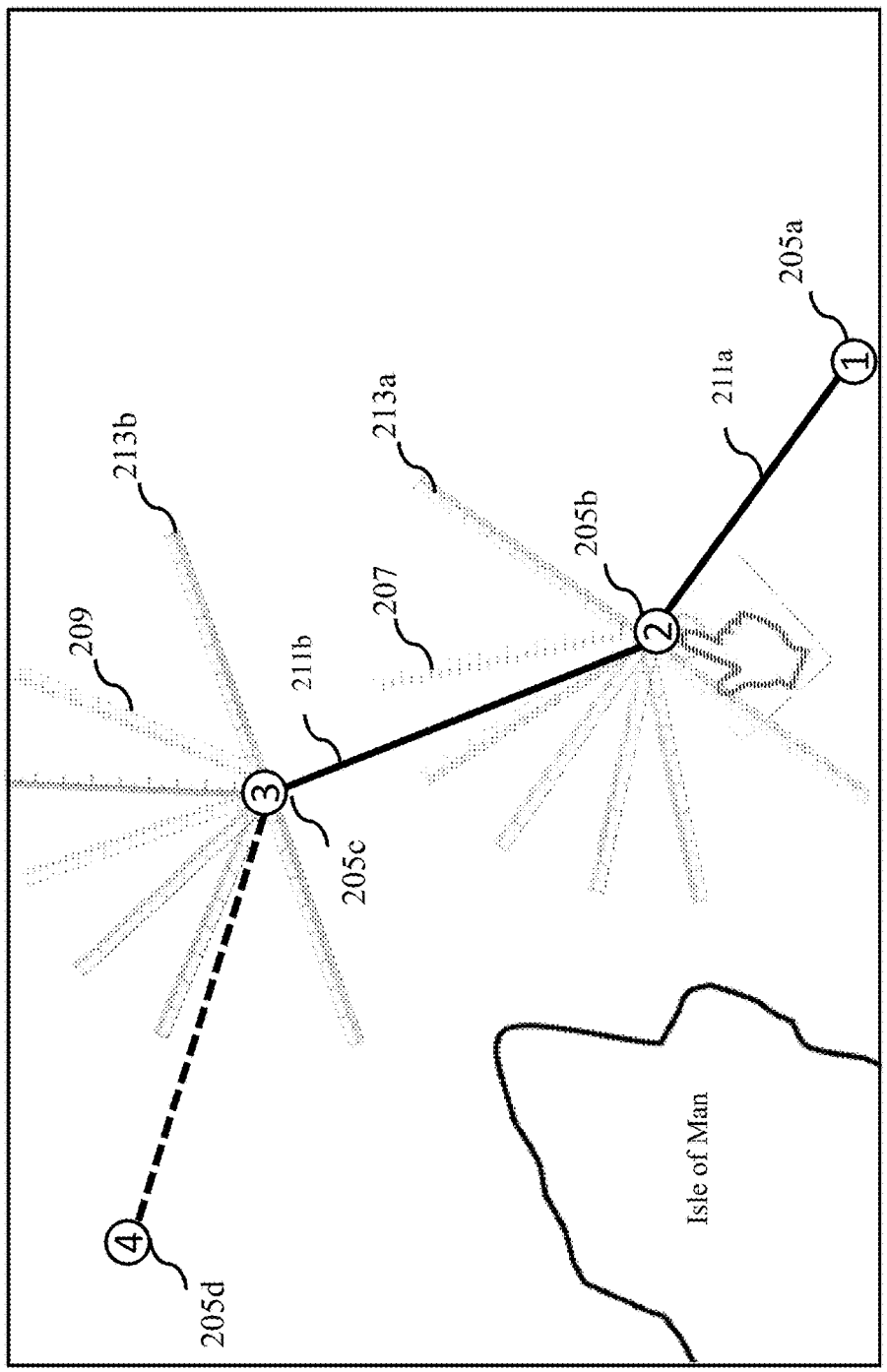
FIG. 3G illustrates a user interface where the first indicator data and the second indicator data is represented using the plurality of auxiliary lines display format illustrated in FIG. 3F, in accordance with an example embodiment.

FIGS. 3D-3G illustrate indicator display formats comprising one or more lines with a scale showing a distance from the plurality of waypoints 205a-205e, where the one or more lines are placed at predetermined intervals in predetermined directions, and the one or more lines pass through the plurality of waypoints 205a-205e. For example, FIG. 3D illustrates an indicator display format comprising a centre line 301 and an auxiliary line 303 perpendicular to the centre line 301, in accordance with an example embodiment. Each line is scaled to show distance from the centre, where the centre corresponds to one of the plurality of waypoints 205a-205e (either the current waypoint 205b or the one or more of the next waypoints 205c-205e). When the first indicator data 207 is represented using the indicator display format of FIG. 3D, a distance from the current waypoint 205b to the one or more next waypoints (205c-205e) may be determined based on the scale indicated on the one or more lines of the first indicator data 207, where the one or more lines pass through the current waypoint 205b. Similarly, when the second indicator data 209 is represented using the indicator display format of FIG. 3D, a distance from a first waypoint (for example, 205c) of the one or more next waypoints 205c-205e to a second waypoint (205d or 205e) of the one or more next waypoints (205c-205e) may be determined based on the scale indicated on the one or more lines of the second indicator data 209, where the one or more lines pass through the first point (for example, 205c) of the one or more next waypoints 205c-205e.

Figure 4:
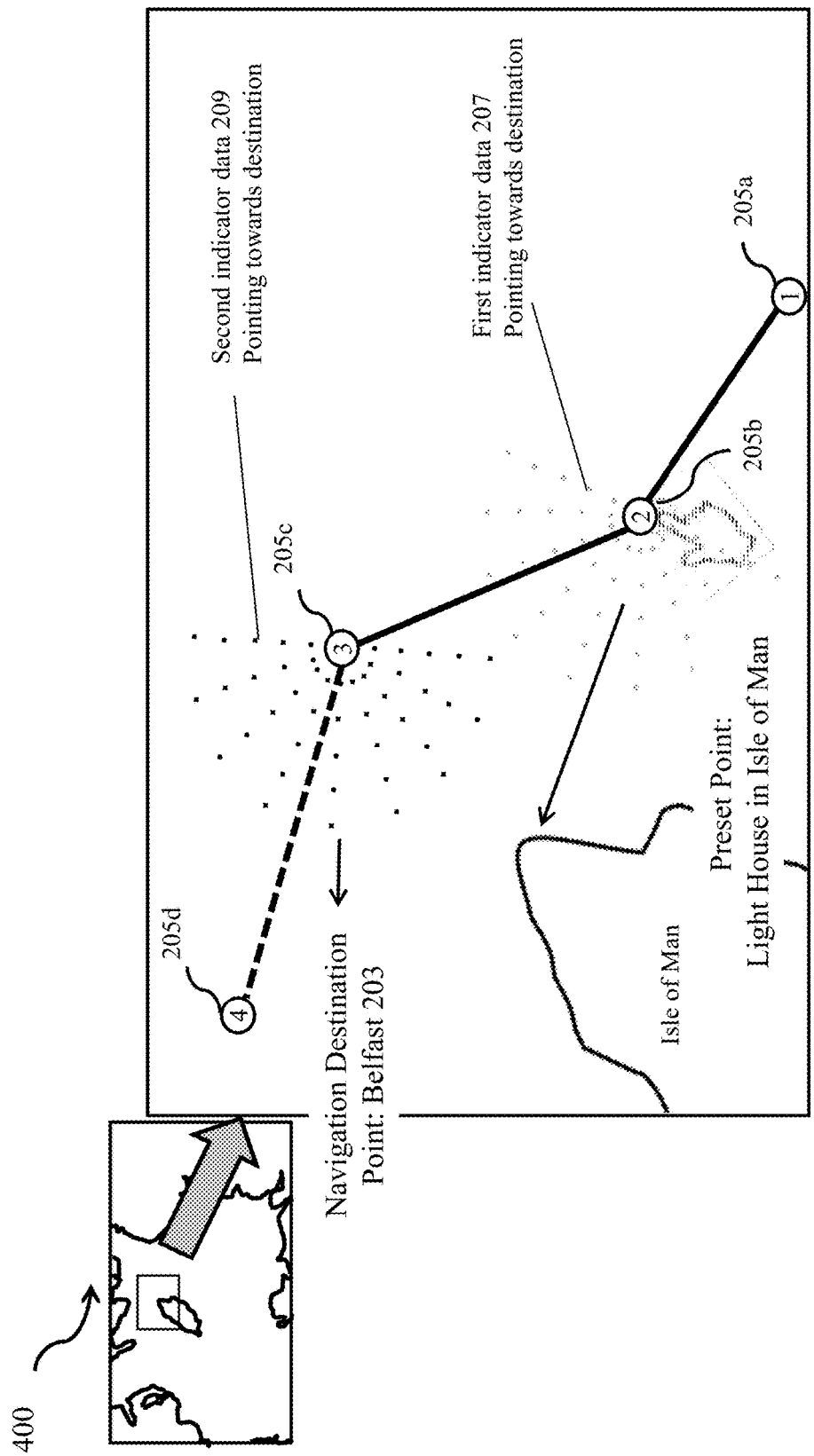
FIG. 4 illustrates a user interface where the first indicator data and the second indicator data are represented with different colors, in accordance with an example embodiment.

FIG. 3E illustrates an indicator display format comprising auxiliary lines 305a and 305b separated by a degree of separation, where the degree of separation is 45° between the center line 301 and the auxiliary line 303 perpendicular to the centre line 301, in accordance with an example embodiment. With the indicator display format of FIG. 3E, selecting a potential position for the next waypoint and the direction from the current waypoint 205b may be determined more accurately. FIG. 3F illustrates an indicator display format comprising plurality of auxiliary lines 307a and 307b between the auxiliary lines 305a and 305b having the degree of separation as 45° in multiple directions and the auxiliary line 303 perpendicular to the center line 301, in accordance with an example embodiment. A user interface where the indicator data format illustrated in FIG. 3F is used is described below with reference to FIG. 3G FIG. 3G illustrates a user interface 300g where the first indicator data 207 and the second indicator data 209 is represented using the plurality of auxiliary lines display format illustrated in FIG. 3F, in accordance with an example embodiment. In FIG. 3G, the first indicator data 207 includes a first orthogonal auxiliary line 213a with a scale showing a distance from the current waypoint 205b to the one or more next waypoints 205c-205e, and where the first orthogonal auxiliary line 213a is perpendicular to the first extension line 211a, and passes through the current waypoint 205b. Similarly, the second indicator data 209 includes a second orthogonal auxiliary line 213b with a scale showing a distance from a first point (for example, 205c) of the one or more next waypoints 205c-205e to a second point (for example, 205d) of the one or more next waypoints 205c-205e, and where the second orthogonal auxiliary line 213b is perpendicular to the second extension line 211b, and passes through the next waypoint (for example, 205c). In another example embodiment, the first extension line 211a comprises a scale showing a distance from the current waypoint 205b to the one or more next waypoints 205c-205e. Similarly, the second extension line 211b comprises a scale showing a distance from a first point of the one or more next waypoints 205c-205e, to a second point of the one or more next waypoints. FIG. 4 illustrates a user interface 400 where the first indicator data 207 and the second indicator data 209 are represented with different shades, using different shade data, in accordance with an example embodiment. In FIG. 4 the second indicator data 209 is indicated with bold and dark black coloured plurality of dots around the next point 205c and the first indicator data 207 is indicated with light coloured plurality of dots. Representing the first indicator data 207 and the second indicator data 209 with different shades, enables the user 103 to easily distinguish between different indicator data. In another example embodiment, the first indicator data 207 and the second indicator data 209 may differ from each other in one or more of color data and luminance data. Further, as illustrated in FIG. 4, a first orientation associated with display of the first indicator data 207 and a second orientation associated with display of the second indicator data 209 are determined by setting the first orientation and the second orientation to a predetermined point, respectively. In an example embodiment, the predetermined point may be the navigation destination point 203 (Belfast). Therefore, the first orientation and the second orientation may be set in a direction pointing towards the navigation destination point 203 shown in FIG. 2B. In another example embodiment, the predetermined point for the current waypoint 205b may correspond to other possible destinations (such as Isle of Man) from the current waypoint 205b and the predetermined point for the next waypoint 205c may correspond to the navigation destination point 203 (i.e. Belfast), as illustrated in FIG. 4.

FIG. 5 is a flowchart that illustrates steps of a navigation planning method 500 executed by the navigation planning device 101, in accordance with an example embodiment. The method 500 starts at step 501. Further, at step 503, the navigation start points 201 and a navigation destination point 203 may be received for a navigation route of a vessel or an aircraft. The navigation start point 201 and the navigation destination point 203 may be inputted by the user 105 through the display 129 and the inputted position data is received by the position specifying unit 117. The navigation start point 201 and the navigation destination point 203 may be specified by the user 103 by touching at specific locations or moving the cursor, or by inputting numerical data on the navigation map displayed on touch screen display panel of the display 129. Alternatively, the position data may also be inputted through the user device 103.

At step 505, a plurality of waypoints 205a-205e between the navigation start point 201 and the navigation destination point 203 may be received by the position specifying unit 117. The plurality of waypoints 205a-205e may correspond to potential positions which may be changed or adjusted in real-time to determine an optimized navigation route. The plurality of waypoints 205a-205e may be selected randomly by the user 103. In another embodiment, the plurality of waypoints 205a-205e may be selected in a sequential order by the user 103. For example, the plurality of waypoints 205a-205e may be specified by the user 103 by touching at specific locations, moving the cursor, or by inputting numerical data on the navigation route map (or the chart data) displayed on touch screen display panel of the display 129. Alternatively, the position data may also be inputted through the user device 103. The plurality of waypoints 205a-205e comprises one or more previously selected waypoints, a current waypoint, and one or more next way points. The navigation route may be determined by connecting the navigation start point 201 to the navigation destination point 203 through one or more waypoints of the plurality of waypoints 205a-205e.

At step 507, a positional relationship between the plurality of waypoints 205a-205e may be determined by the positional relation determination unit 119. The positional relationship may be determined based on position data of the plurality of waypoints 205a-205e, where the position data may comprise longitude and latitude information associated with each waypoint of the plurality of waypoints. The determined positional relationship between the one or more waypoints of the plurality of waypoints 205a-205e may be indicated on the navigation map, where the indicated positional relationship enables the user 105 to select the next waypoint to determine an optimized navigation route.

At step 509, at least one indicator data corresponding to at least one waypoint of the plurality of waypoints 205a-205e may be determined, based on the positional relationship between the plurality of waypoints 205a-205e. The indicator data comprises a first indicator data 207 (or a current indicator data) corresponding to the current waypoint, where the first indicator data 207 indicates a distance from the current waypoint. The distance from the current waypoint is displayed in a current waypoint area opposite the potential position of the one or more of previously selected waypoints. Further, the indicator data comprises a second indicator data 209 (or a next indicator data) corresponding to the next waypoint, where the second indicator data 209 indicates a distance from the next waypoint. The distance from the next waypoint is displayed in a next waypoint area opposite the potential position of the current waypoint.

At step 511, the at least one waypoint and the corresponding at least one indicator data may be outputted or provided to the display 129 for displaying the at least one waypoint and the corresponding at least one indicator data associated with navigation route of the vessel or the aircraft. The user 105 may select one indicator display format of different indicator display format as illustrated in FIG. 3A to FIG. 3F. The indicator display format may be used to determine which one or more waypoints of the plurality of waypoints 205*a*-205*e* should be connected in order to determine the optimized navigation route. The optimized navigation route may be displayed on the display 129. Alternatively, the optimized navigation route may also be displayed on a screen of the user device 103.

Example embodiments of the present application may thus provide for the navigation planning device 101 and the navigation planning apparatus that ensure accurate and easy selection of the one or more waypoints of the plurality of waypoints 205*a*-205*e* in order to determine the optimized navigation route for the vessel or for the aircraft. To that end, the navigation planning apparatus 101 obtains the navigation start point 201, the navigation destination point 203, and the plurality of waypoints 205*a*-205*e*. The plurality of waypoints 205*a*-205*e* is obtained in at least one of random order or in a sequential order. The plurality of waypoints 205*a*-205*e* corresponds to potential positions which may be changed or adjusted based on the requirement. Further, the navigation planning apparatus 101 determines the optimized navigation route for the vessel for travelling from the navigation start point 201 to the navigation destination point 203 through one or more waypoints of the plurality of waypoints 205*a*-205*e* by adjusting the potential positions of the one or more waypoints. In order to adjust the potential positions of the one or more waypoints, the apparatus obtains the positional relationship between the plurality of waypoints 205*a*-205*e*. Further, based on the positional relationship between the plurality of waypoints 205*a*-205*e*, the navigation planning apparatus 101 determines at least one indicator data corresponding to at least one waypoint of the plurality of waypoints 205*a*-205*e*. The determined at least one indicator data is displayed at the corresponding waypoint. Further, the optimized navigation route may be determined by connecting the navigation start point 201 to the navigation destination point 203 through the one or more waypoints of the plurality of waypoints 205*a*-205*e*, where the indicator display data indicating the positional relationship between the plurality of waypoints 205*a*-205*e* are used to adjust the potential positions of the one or more waypoints of the plurality of waypoints 205*a*-205*e*.

Many modifications and other embodiments of the applications set forth herein will come to mind of one skilled in the art to which these applications pertain having the benefit of the teachings presented in the foregoing descriptions and the associated drawings. Therefore, it is to be understood that the applications are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims Although specific terms are employed herein, they are used in a generic and descriptive sense only and not for purposes of limitation.

We claim:

1. A navigation planning device comprising:
   starting and destination point receiving terminal configured to receive a navigation start point and a navigation destination point for a navigation route of a vessel or an aircraft;
   waypoint receiving terminal configured to receive a plurality of waypoints between the navigation start point and the navigation destination point;
   processing circuitry configured to:
      determine a positional relationship between the plurality of waypoints, wherein the plurality of waypoints is received in one type of order, and wherein the one type of order comprises a random order or a sequential order;
      determine at least one indicator data corresponding to at least one waypoint data of the plurality of waypoints, based on the positional relationship between the plurality of waypoints; and
      output the at least one waypoint data and the corresponding at least one indicator data for the navigation route, to a display for displaying the at least one waypoint data and the corresponding at least one indicator data,
   wherein a first orientation associated with the display of a first indicator data is determined based on the positional relationship between a first waypoint and a second waypoint;
   a second orientation associated with the display of a second indicator data is determined based on the positional relationship between the second waypoint and a third waypoint; and
   when a candidate position of the second waypoint is moved, the first orientation and the second orientation are changed, simultaneously, based on the movement of the candidate position of the second waypoint.

2. The navigation planning device of claim 1,
   wherein receiving the navigation start point, the navigation destination point, and the plurality of waypoints corresponds to receiving position data associated with at least one of the navigation start point, the navigation destination point, and the plurality of waypoints, wherein the position data is received by at least one of: touching the display panel, a cursor on the display panel, or by inputting numerical data, and
   wherein the processing circuitry is further configured to determine the navigation route by connecting the navigation start point, one or more waypoints of the plurality of waypoints, and the navigation destination point.

3. The navigation planning device of claim 1, wherein the plurality of waypoints comprise one or more of the first waypoint, the second waypoint, and the third waypoint,
   wherein the first waypoint is followed by the second waypoint on the navigation route between the navigation start point and the navigation destination point;
   wherein the second waypoint is followed by the third waypoint on the navigation route between the navigation start point and the navigation destination point;
   wherein the first waypoint is one previously selected waypoints, the second waypoint is the candidate position for a current waypoint, and the third waypoint is the candidate position for one next waypoints; and wherein the positional relationship between the plurality of waypoints is determined based on position information associated with the one previously selected waypoints and position information associated with the potential position for the current waypoint.

4. The navigation planning device of claim 3, wherein the at least one indicator data comprises:

the first indicator data corresponding to the current waypoint, wherein the first indicator data indicates a distance from the current waypoint, wherein the distance is displayed in a current waypoint area opposite the potential position of the one previously selected waypoints;

the second indicator data corresponding to the next waypoint, wherein the second indicator data indicates a distance from the next waypoint, wherein the distance is displayed in a next waypoint area opposite the potential position of the current waypoint; and wherein the first indicator data and the second indicator data are displayed simultaneously.

5. The navigation planning device of claim 4, wherein:

the first orientation associated with the display of the first indicator data and the second orientation associated with the display of the second indicator data are determined by setting the first orientation and the second orientation to a predetermined point, respectively; and when the candidate position of the second waypoint is moved, the first orientation and the second orientation are changed, simultaneously, based on the movement of the candidate position of the second waypoint.

6. The navigation planning device of claim 4, wherein the first indicator data includes one or more lines with a scale showing a distance from the current waypoint to the next waypoints, wherein the one or more lines are placed at predetermined intervals in predetermined directions, and wherein the one or more lines pass through the second waypoint; and wherein the second indicator data further includes one or more lines with a scale showing a distance from a first point of the next waypoints to a second point of another next waypoints, wherein the one or more lines are placed at predetermined intervals in predetermined directions, and wherein the one or more lines pass through the third waypoint.

7. The navigation planning device of claim 4, wherein the first indicator data and the second indicator data differ from each other in one or more of color data, shade data, and luminance data for display.

8. The navigation planning device of claim 4, wherein the first indicator data includes a plurality of dots arranged concentrically around the second waypoint at predetermined intervals in one or more directions, and wherein the one or more directions are based on the first orientation, and wherein the second indicator data includes a plurality of dots arranged concentrically around the third waypoint at predetermined intervals in one or more directions, and wherein the one or more directions are based on the second orientation.

9. The navigation planning device of claim 4, wherein the first indicator data includes a plurality of dots arranged on one or more lines placed at predetermined intervals in predetermined directions, wherein the one or more lines pass through the second waypoint, and wherein the one or more directions are based on the first orientation; and wherein the second indicator data includes a plurality of dots arranged on one or more lines placed at predetermined intervals in predetermined directions, wherein the one or more lines pass through the third waypoint, and wherein the one or more directions are based on the second orientation.

10. The navigation planning device of claim 4, wherein the first indicator data includes the plurality of dots arranged on a first extension line connecting the first waypoint and the second waypoint, and wherein the second indicator data includes the plurality of dots arranged on a second extension line connecting the second waypoint and the third waypoint.

11. The navigation planning device of claim 10, wherein the first indicator data includes a first orthogonal auxiliary line with a scale showing a distance from the current waypoint to the next waypoints, and wherein the first orthogonal auxiliary line is perpendicular to the first extension line, and passes through the current waypoint; and wherein the second indicator data includes a second orthogonal auxiliary line with a scale showing a distance from a first point of the next waypoints to a second point of another next waypoints, and wherein the second orthogonal auxiliary line is perpendicular to the second extension line, and passes through the third waypoint.

12. The navigation planning device of claim 11, wherein the first extension line comprises a scale showing a distance from the current waypoint to the next waypoint; and wherein the second extension line comprises a scale showing a distance from a first point of the next waypoints to a second point of another next waypoints.

13. The navigation planning device of claim 12, wherein the first indicator data includes the plurality of dots arranged on a first line perpendicular to the first extension line, and wherein the first line passes through the second waypoint; and wherein the second indicator data includes the plurality of dots arranged on a second line perpendicular to the second extension line, and wherein the second line passes through the third waypoint.

14. The navigation planning device of claim 1, further comprising:

a memory configured to store a chart data for navigation;

a display configured to:

display at least a part of the chart on a display panel;

receive a navigation start point and a navigation destination point for a navigation route of a vessel or an aircraft;

receive a plurality of waypoints between the navigation start point and the navigation destination point, wherein the plurality of waypoints is received in one type of order, and wherein the at least one type of order comprises a random order or a sequential order, and display the at least one waypoint data and the corresponding at least one indicator data for the navigation route on the display panel.

15. A navigation planning method, comprising:

receiving a navigation start point and a navigation destination point for a navigation route of a vessel or an aircraft;

receiving a plurality of waypoints between the navigation start point and the navigation destination point;

determining a positional relationship between the plurality of waypoints, wherein the plurality of waypoints is received in at least one type of order, and wherein the one type of order comprises a random order or a sequential order;

determining at least one indicator data corresponding to at least one waypoint data of the plurality of waypoints, based on the positional relationship between the plurality of waypoints; and outputting the at least one waypoint data and the corresponding at least one indicator data for the navigation route, to a display for displaying the at least one waypoint and the corresponding at least one indicator data, wherein a first orientation associated with the display of a first indicator data is determined based on the positional relationship between a first waypoint and a second waypoint;

a second orientation associated with the display of a second indicator data is determined based on the positional relationship between the second waypoint and a third waypoint; and when a candidate position of the second waypoint is moved, the first orientation and the second orientation are changed, simultaneously, based on the movement of the candidate position of the second waypoint.

16. The navigation planning method of claim 15, wherein receiving the navigation start point, the navigation destination point, and the plurality of waypoints corresponds to receiving position data associated with at least one of the navigation start point, the navigation destination point, and the plurality of waypoints, wherein the position data is received by at least one of: touching the display panel, a cursor on the display panel, or by inputting numerical data, and wherein the navigation planning method further comprises determining the navigation route by connecting the navigation start point, one or more waypoints of the plurality of waypoints, and the navigation destination point.

17. The navigation planning method of claim 15, wherein the plurality of waypoints comprise one or more of the first waypoint, the second waypoint, and the third waypoint, wherein the first waypoint is followed by the second waypoint on the navigation route between the navigation start point and the navigation destination point;

wherein the second waypoint is followed by the third waypoint on the navigation route between the navigation start point and the navigation destination point;

wherein the first waypoint is one previously selected waypoints, the second waypoint is a candidate position for a current waypoint, and the third waypoint is a candidate position for one next waypoints; and wherein the positional relationship between the plurality of waypoints is determined based on position information associated with the previously selected waypoints and position information associated with the potential position for the current waypoint.

18. The navigation planning method of claim 17, wherein the at least one indicator data comprises:

the first indicator data corresponding to the current waypoint, wherein the first indicator data indicates a distance from the current waypoint, wherein the distance is displayed in a current waypoint area opposite the potential position of the previously selected waypoints;

the second indicator data corresponding to the next waypoint, wherein the second indicator data indicates a distance from the next waypoint, wherein the distance is displayed in a next waypoint area opposite the potential position of the current waypoint; and wherein the first indicator data and the second indicator data are displayed simultaneously.

19. A non-transitory computer readable medium storing instructions that, when executed by one or more processors, cause a computing device to perform a method that comprises:

receiving a navigation start point and a navigation destination point for a navigation route of at least one of a vessel or an aircraft;

receiving a plurality of waypoints between the navigation start point and the navigation destination point;

determining a positional relationship between the plurality of waypoints, wherein the plurality of waypoints is received in at least one type of order, and wherein the at least one type of order comprises a random order or a sequential order;

determining at least one indicator data corresponding to at least one waypoint data of the plurality of waypoints, based on the positional relationship between the plurality of waypoints; and outputting the at least one waypoint data and the corresponding at least one indicator data for the navigation route, to a display for displaying the at least one waypoint and the corresponding at least one indicator data, wherein a first orientation associated with the display of a first indicator data is determined based on the positional relationship between a first waypoint and a second waypoint;

a second orientation associated with the display of a second indicator data is determined based on the positional relationship between the second waypoint and a third waypoint; and when a candidate position of the second waypoint is moved, the first orientation and the second orientation are changed, simultaneously, based on the movement of the candidate position of the second waypoint.

* * * * *